United States Patent [19]

Gorans

[11] 4,393,851
[45] Jul. 19, 1983

[54] DIESEL FUEL TEMPERATURE CONTROLLING APPARATUS

[75] Inventor: Marc S. Gorans, Willmar, Minn.

[73] Assignee: Phillips Temro, Inc., Eden Prairie, Minn.

[21] Appl. No.: 224,917

[22] Filed: Jan. 14, 1981

[51] Int. Cl.³ .......................................... F02M 31/00
[52] U.S. Cl. ..................................... 123/557; 123/552
[58] Field of Search ................. 123/552, 557, 546; 236/93 A; 165/35

[56] References Cited

U.S. PATENT DOCUMENTS

| 1,318,068 | 10/1919 | Giesler | |
|---|---|---|---|
| 1,319,718 | 10/1919 | Martin | 123/557 |
| 1,945,178 | 1/1934 | Carter | 123/552 |
| 2,104,974 | 1/1938 | Dawes | 257/2 |
| 2,419,630 | 4/1947 | Cruzan | 165/35 |
| 2,788,176 | 4/1957 | Andersen | 236/34.5 |
| 2,820,593 | 1/1958 | Goodbar | 236/12 |
| 3,019,986 | 2/1962 | Schoerner | 236/12 |
| 3,047,055 | 7/1962 | Kimm | 236/93 A |
| 3,398,891 | 8/1968 | Horne | 165/35 |
| 3,472,214 | 10/1969 | Moon | 123/122 |
| 3,738,334 | 6/1973 | Farr | 123/557 |
| 3,913,543 | 10/1975 | Richard | 123/122 |
| 3,990,418 | 11/1976 | Nohira et al. | 123/119 A |
| 4,044,742 | 8/1977 | Linder | 123/122 |
| 4,072,138 | 2/1978 | Hawkins et al. | 123/122 |
| 4,146,002 | 3/1979 | Quinn | 123/557 |
| 4,231,342 | 11/1980 | Johnston | 123/557 |
| 4,306,617 | 12/1981 | Lancaster | 123/557 |
| 4,329,963 | 5/1982 | Grager | 123/552 |

FOREIGN PATENT DOCUMENTS 973439  8/1975  Canada .................................. 123/557

Primary Examiner—Ronald H. Lazarus
Attorney, Agent, or Firm—Schroeder, Siegfried, Vidas, Steffey & Arrett

[57] ABSTRACT

A temperature-controlling system for a fuel supply line characterized by a simple and inexpensive thermostatically controlled valve positioned within the flow, and sensitive to the temperature, of the fuel before it has been mixed with bypassed and heated fuel. The valve modulates the flow bypassed through a heat exchanger, which flow later joins the stream of fuel which has not been bypassed and heated.

14 Claims, 5 Drawing Figures

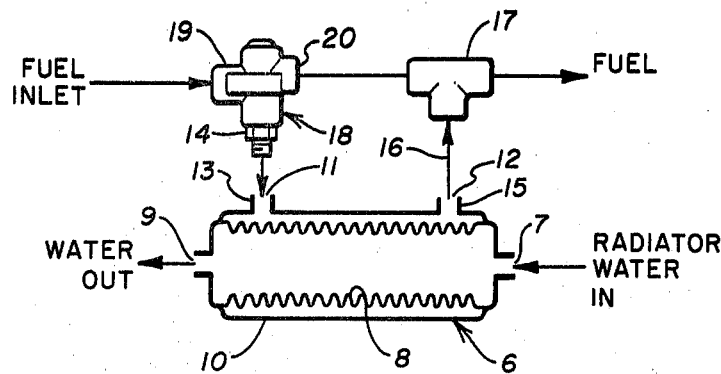
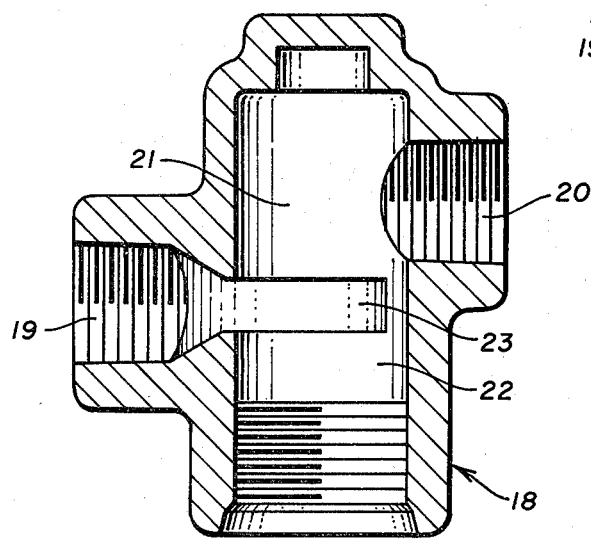
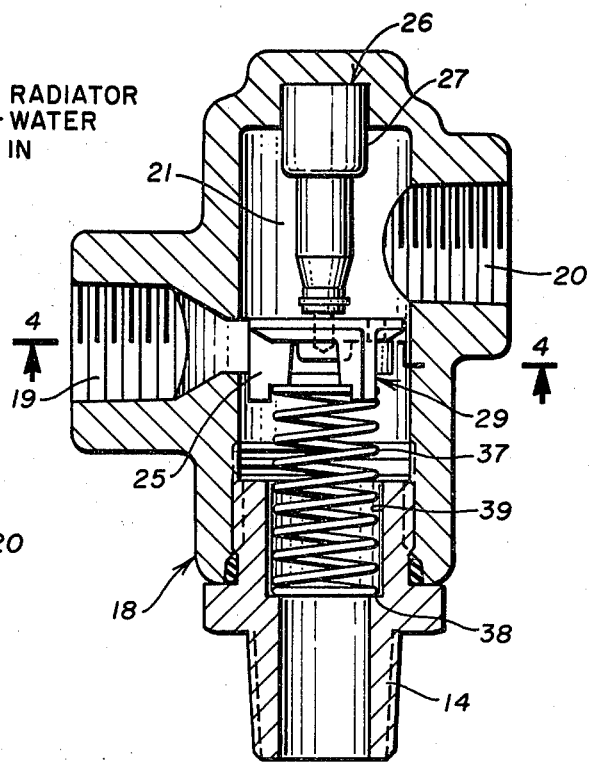
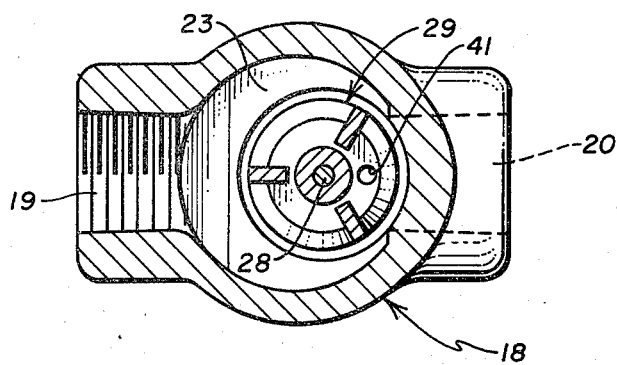

DIESEL FUEL TEMPERATURE CONTROLLING APPARATUS

DESCRIPTION

Background of Prior Art

Various fuel heating devices and systems have been designed in the past for the purpose of warming the fuel supply, especially for diesel motors, after it leaves the supply tank and before it reaches the point of ignition in the motor. It is especially important to insure that the fuel is warmed sufficiently to preclude what is commonly referred to as "waxing" which is a phenomenon that takes place in fuel oil at low temperatures and tends to clog the fuel filters. This phenomenon occurs at lower temperatures in more expensive fuel than in less expensive fuels and thus, if it can be precluded by warming with effective and inexpensive apparatus prior to reaching the fuel filter, less expensive fuels may be utilized. These problems are discussed fully in U.S. Pat. No. 3,472,214 issued to Charles L. Moon in Oct. 14, 1969, which patent constitutes the closest prior art presently known to me. The apparatus shown therein, however, is relatively complicated and expensive to manufacture and operates on a different principle, namely, the control of the flow of fuel through a heat exchanger in response to the temperature of the fuel after it has been mixed with bypassed and heated fuel. Most other fuel warmers modulate the temperatures of the fuel by running all of the fuel through the heat exchanger and modifying the amount of coolant which is passed through the heat exchanger.

BRIEF DESCRIPTION OF THE DRAWINGS

FIG. 1 is a schematic side elevational view of my apparatus for controlling the temperature of fuel flowing in a supply line;

FIG. 2 is a vertical sectional view taken through the axis of my combined valve housing and fuel conduit structure;

FIG. 3 is a vertical sectional view of my combined valve housing and fuel conduit structure with the flow controlling valve means mounted therein;

FIG. 4 is a sectional view taken along line 4—4 of FIG. 3; and

FIG. 5 is a perspective view of the valve elememt.

DETAILED DESCRIPTION OF THE INVENTION

FIG. 1 shows a heat exchanger 6 in which the coolant from the motor enters at 7 into a corrugated tube or core 8 and exits at 9. A jacket 10 surrounds the heat-exchanging core 8 and has a cold fuel inlet 11 and a warmed fuel outlet 12. A fluid conduit 13 connects the cold fuel inlet 11 with bypass connector 14 to convey the fuel bypassed by the valve, as hereinafter described, into the heat exchanger 6, where it is heated by the heat exchanging core 8 as it moves longitudinally thereof to the outlet 12.

Connector 15 is connected by a conduit 16, indicated schematically, to a T-connector 17 which receives cold fuel at its other inlet from outlet 20 and mixes the same with the heated fuel received from the heat exchanger 6 before it reaches the fuel filter of the motor.

My combined valve housing and fuel conduit structure, as best shown in FIG. 2-4 inclusive, is comprised of a cast housing 18 which defines a fuel conduit having a fuel inlet passage 19, a fuel outlet passage 20, and a connecting passage or bore 21. Extending coaxially with bore 21 and in an opposite direction from bore 21, is a second bore 22 of equal diameter which defines with connector 14 a bypass fluid conduit that leads to the heat exchanger 6. The walls of the bore 21 are relieved circumferentially directly opposite to and from the fuel inlet passage 19 as at 23 to a point adjacent the fuel outlet 20, as shown at 24. The relieved area, as best shown in FIG. 3 extends axially coextensively with the bore of fuel inlet 19 and, as shown in FIG. 3, defines a junction passage 25 for the fuel conduit structure and the fluid conduit means which means includes elements 13, 14, 15, 16, 17 and 22.

Thermostatic valve means, indicated generally at 26, is mounted within bores 21 and 22 and includes a temperature sensitive actuator having a chamber defining body 27 which contains a thermally expansible and contractible wax, or liquid, the volume of which increases as the temperature thereof rises and decreases as it lowers. A piston member 28 is actuated thereby in response to changes in the temperature of the wax. This activator may also be of the type shown in the above Moon patent and is well known in the art. As shown, it is disposed in the flow path of the fuel as it flows through fuel inlet passage 19, bore 21 and outlet passage 20 and therefor is sensitive only to the temperature of the fuel coming from the supply tank as it enters the fuel conduit passage.

Disposed and moving axially within the bores 21 and 22 is valve element 29 which is comprised of a disc 30. From the underside thereof extends three legs 31, 32, and 33, located adjacent the periphery of the disc. Each of these legs is relieved at the inner portion of its outer and free end as at 34, 35, and 36, respectively, to cooperatively form a seat for the upper end of spring 37. The lower end of spring 37 is supported upon shoulder 38 provided by counter bore 39 in connector 14.

The central portion of the upper surface of valve element 29 is recessed to receive the outer end of piston 28, as shown in FIG. 3. A cup member 40 carried by the undersurface of the valve element confines that outer end. A small opening 41 extends axially through the disc 30 so that the temperature sensitive chamber 26 will at all times be in contact with fuel entering the fuel inlet, irrespective of the position of the valve element, even if it enters the passage defined by bore 21.

From the above it can be seen that I have provided apparatus for modulating the flow of fuel through the direct fuel supply line, and the bypass leading through the heat exchanger, which is simple and relatively inexpensive to manufacture and install, and is directly sensitive to the temperature of the fuel coming from the supply tank. Thus, prior to the temperature dropping to the "waxing" level, a portion of such fuel will be bypassed through the heat exchanger 6 and, after being heated will be reunited in the fuel line which connects directly to the motor. If the temperature continues to drop, the piston 28 will be forced by the spring inwardly farther into chamber body 26 and an increased proportion of fuel will be bypassed through the heat exchanger. Whenever the temperature of the fuel supply rises, it will be sensed by the wax within the chamber 26, which will expand and force the value element away from the body 26 and thereby cause a smaller proportion of fuel to enter the heat exchanger 6.

It will be readily seen that I have provided a very simple thermostatically controlled apparatus which can be manufactured quite inexpensively. Moreover, it is more sensitive in that it reacts and adjusts to a drop in temperature as soon as the temperature of the fuel supply varies, instead of after the colder fuel has been partially warmed by the heat exchanger and found wanting as to temperature level. It should be noted that the heat exchanger which I utilize is very simple and inexpensive as to design and it can be easily inserted into the coolant line of the motor.

It will be understood, of course, that the amount of wax in the chamber defining body 27 and the length of the piston 28 are correlated so that the valve element 30 will be in position to bypass the fuel through the heat exchanger 6 at the temperature level desired and, in any event, prior to the temperature descending to the "waxing level" of the fuel. As the temperature rises, the valve element will be forced away from the body 26 and less fuel will be bypassed through the heat exchanger until essentially no fuel will be bypassed when the temperature of the fuel supply reaches the ideal level.

In considering this invention it should be remembered that the present disclosure is illustrative only and the scope of the invention should be determined by the appended claims.

I claim:

1. Apparatus for controlling the temperature of liquid fuel flowing in a fuel supply line while maintaining the same in liquid form comprising:
   (a) fuel conduit structure having fuel inlet and outlet passages;
   (b) a fuel-heating heat exchanger having heat exchange surfaces which define a fuel passageway connected in fuel communicating relation with said inlet and outlet passages;
   (c) fluid conduit means defining a bypass passageway communicating with said inlet and outlet passages and effective to bypass fuel from said fuel conduit structure through said heat exchanger;
   (d) thermostatic valve means for modulating the flow of such fuel through said passageways in response to temperature of unmixed and unheated bypassed fuel in said fuel conduit structure; and
   (e) said valve means being constructed and arranged within said fuel conduit structure to direct the flow of fuel through said conduit structure when the fuel supply entering said inlet is warm and through said fluid conduit means and said heat exchanger when the fuel supply entering said inlet is cold.

2. Apparatus for controlling the temperature of liquid fuel flowing in a fuel supply line while maintaining the same in liquid form comprising:
   (a) a fuel conduit structure having fuel inlet and outlet passages;
   (b) a fuel-heating heat exchanger having heat exchanging surfaces which define in part at least a fuel passageway to be connected in fuel-communicating relation with said fuel inlet and outlet passages;
   (c) fluid conduit means defining a bypass passageway communicating with said inlet and outlet passages and effective to bypass fuel through said heat exchanger in order to absorb heat therefrom,
   (d) thermostatically controlled valve means connected with said fuel conduit structure for modulating the flow of such fuel through said passageways, said valve means including a thermostatic sensing element located in the path of and responsive to the temperature of unmixed and unheated fuel moving through said inlet passage and fuel conduit structure to said outlet passage; and
   (e) said valve means being constructed and arranged within said fuel conduit structure to direct the flow of fluid through said conduit structure when the fuel entering said fuel inlet passage is warm and through said fluid conduit means and said heat exchanger when the fuel entering said inlet passage is cold.

3. The structure defined in claim 1 wherein said fuel conduit structure has an enlarged bore adjacent said valve means.

4. The structure defined in claim 1 wherein said valve means includes thermally responsive actuating means located within said fuel conduit structure.

5. The structure defined in claim 1 wherein said valve means includes a valve element and thermally responsive actuating means located on the side of said valve element opposite said fluid conduit means.

6. The structure defined in claim 1 wherein said valve means includes a valve element and thermally responsive actuating means therefor, said actuating means being located entirely outside the flow of fuel which is bypassed through said fluid conduit means.

7. The structure defined in claim 1 wherein said fuel conduit structure and said fluid conduit means have a juncture passage and said valve means includes a valve element comprised of a disc moving within said juncture passage to modulate the flow through said fuel conduit structure and said fluid conduit means in response to the temperature of the unmixed and unheated fuel within said fuel conduit structure.

8. The structure defined in claim 1 wherein said valve means includes a thermally responsive actuator located within said fuel conduit structure in the path of unheated fuel passing therethrough and a valve element actuated by said actuator, said fuel conduit structure and said fluid conduit means having a juncture passage and said valve element being located and moving within said juncture passage to modulate the flow of fuel through said passageways.

9. The structure defined in claim 1 wherein said fuel conduit structure includes fuel passage structure leading to said outlet passage and fuel passage structure leading to said fluid conduit means, and said valve means moves between said fuel passage structures to modulate the flow of such fuel through said passageways.

10. The structure defined in claim 1 wherein said heat exchanger includes a tubular jacket having a fuel inlet and a fuel outlet, and a coolant-conducting tube extending through said jacket and defining therewith a portion of said fluid conduit means.

11. The structure defined in claim 1 wherein said fluid conduit means is connected directly to said fuel conduit structure at a point behind said fuel outlet passage with respect to the flow of fuel therethrough.

12. The structure defined in claim 1, wherein said valve means includes a thermostatically actuated valve element moving between said fuel conduit structure and said fluid conduit means.

13. Apparatus for controlling the temperature of fuel flowing in a fuel supply line comprising:
   (a) fuel conduit structure having fuel inlet and outlet passages;
   (b) a fuel-heating heat exchanger having heat exchange surfaces which define a fuel passageway connected in fuel communicating relation with said inlet and outlet passages;

(c) fluid conduit means defining a bypass passageway communicating with said inlet and outlet passages and effective to bypass fuel from said fuel conduit structure through said heat exchanger;

(d) thermostatic valve means for modulating the flow of such fuel through said passageways in response to temperature of unmixed and unheated bypassed fuel in said fuel conduit structure; and (e) said valve means including a valve element varying the flow of unheated fuel through said fuel conduit structure, said valve element having a small passage extending therethrough to permit at least a small amount of unheated fuel to pass through said fuel conduit structure at all times.

14. Apparatus for controlling the temperature of fuel flowing in a fuel supply line comprising:

(a) fuel conduit structure having fuel inlet and outlet passages;

(b) a fuel-heating heat exchanger having heat exchanging surfaces which define in part at least a fuel passageway to be connected in fuel-communicating relation with said fuel inlet and outlet passages;

(c) fluid conduit means defining a bypass passageway communicating with said inlet and outlet passages and effective to bypass fuel through said heat exchanger in order to absorb heat therefrom;

(d) thermostatically controlled valve means connected with said fuel conduit structure for modulating the flow of such fuel through said passageways, said valve means including a thermostatic sensing element located in the path of and responsive to the temperature of unmixed and unheated fuel moving through said inlet passage and fuel conduit structure to said outlet passage; and (e) said valve means including a valve element varying the flow of unheated fuel through said fuel conduit structure and thermally responsive actuating means within said fuel conduit structure actuating said valve element in response to the temperature of unheated fuel passing through said fuel conduit structure, said valve element having a small passage extending therethrough to permit at least a small amount of unheated fuel at all times to pass through said fuel conduit structure and to contact said thermally responsive actuating means.

* * * * *